United States Patent [19]
Bromley

[11] Patent Number: 6,038,312
[45] Date of Patent: Mar. 14, 2000

[54] TELEPHONE SUPPORTING DEVICE

[76] Inventor: Jonathan P. Bromley, 12A Eastbury Court 37 Lyonsdown Road, New Barnet, Hertfordshire, United Kingdom, EN5 1LD

[21] Appl. No.: 09/061,194

[22] Filed: Apr. 16, 1998

[51] Int. Cl.[7] .................................................. H04M 1/00
[52] U.S. Cl. ........................... 379/430; 379/449; 379/446
[58] Field of Search .................................. 379/430, 449, 379/446, 455, 454

[56] References Cited

U.S. PATENT DOCUMENTS 5,828,749  10/1998  Brodskiy .................................. 379/430

Primary Examiner—Jack Chiang

[57] ABSTRACT

A new telephone supporting device for preventing cricks and cramps in the neck caused by holding a phone between the head and shoulder. The inventive device includes a headband having a generally inverted U-shaped configuration. A lower end has an elongated vertically disposed slot formed therethrough. A telephone clamp is adjustably coupled with respect to the headband. The telephone clamp includes a vertical portion having outwardly extending tab portions from opposite ends thereof. A space between the tab portions is dimensioned for receiving a telephone therebetween. One of the tab portions has an adjustment screw extending therethrough for engaging the telephone when positioned therein. The adjustment screw has a gripping pad disposed on a free end thereof. The vertical portion has a screw extending inwardly therefrom for extending through the slot of the lower end of the headband. A nut engages the screw for locking the telephone clamp with respect to the headband.

6 Claims, 2 Drawing Sheets

TELEPHONE SUPPORTING DEVICE

BACKGROUND OF THE INVENTION

1. Field of the Invention

The present invention relates to telephone supports and more particularly pertains to a new telephone supporting device for preventing cricks and cramps in the neck caused by holding a phone between the head and shoulder.

2. Description of the Prior Art

The use of telephone supports is known in the prior art. More specifically, telephone supports heretofore devised and utilized are known to consist basically of familiar, expected and obvious structural configurations, notwithstanding the myriad of designs encompassed by the crowded prior art which have been developed for the fulfillment of countless objectives and requirements.

Known prior art telephone supports include U. S. Pat. No. 5,233,650 to Chan; U.S. Pat. No. 4,048,453 to Seidel; U.S. Pat. No. Des. 350,965 to Schulz; U.S. Pat. No. 5,008,932 to Sieggen; U.S. Pat. No. Des. 320,605 to Chan; and U.S. Pat. No. 4,881,256 to Malekos.

While these devices fulfill their respective, particular objectives and requirements, the aforementioned patents do not disclose a new telephone supporting device. The inventive device includes a headband having a generally inverted U-shaped configuration. A lower end has an elongated vertically disposed slot formed therethrough. A telephone clamp is adjustably coupled with respect to the headband. The telephone clamp includes a vertical portion having outwardly extending tab portions from opposite ends thereof. A space between the tab portions is dimensioned for receiving a telephone therebetween. One of the tab portions has an adjustment screw extending therethrough for engaging the telephone when positioned therein. The adjustment screw has a gripping pad disposed on a free end thereof. The vertical portion has a screw extending inwardly therefrom for extending through the slot of the lower end of the headband. A nut engages the screw for locking the telephone clamp with respect to the headband.

In these respects, the telephone supporting device according to the present invention substantially departs from the conventional concepts and designs of the prior art, and in so doing provides an apparatus primarily developed for the purpose of preventing cricks and cramps in the neck caused by holding a phone between the head and shoulder.

SUMMARY OF THE INVENTION

In view of the foregoing disadvantages inherent in the known types of telephone supports now present in the prior art, the present invention provides a new telephone supporting device construction wherein the same can be utilized for preventing cricks and cramps in the neck caused by holding a phone between the head and shoulder.

The general purpose of the present invention, which will be described subsequently in greater detail, is to provide a new telephone supporting device apparatus and method which has many of the advantages of the telephone supports mentioned heretofore and many novel features that result in a new telephone supporting device which is not anticipated, rendered obvious, suggested, or even implied by any of the prior art telephone supports, either alone or in any combination thereof.

To attain this, the present invention generally comprises a headband having a generally inverted U-shaped configuration. The headband includes a pair of opposed arcuate sections adjustably coupled together. An upper section has a channel formed therein. A lower section has an elongated band slidably received within the channel. An adjustment screw extends through the upper section into communication with the channel for engaging the elongated band. A lower portion of the lower section has an outward bend formed therein. The lower section has a lower end that swivels with respect thereto. The lower end has an elongated vertically disposed slot formed therethrough. A telephone clamp is adjustably coupled with respect to the headband. The telephone clamp includes a vertical portion having outwardly extending tab portions from opposite ends thereof. A space between the tab portions is dimensioned for receiving a telephone therebetween. One of the tab portions has an adjustment screw extending therethrough for engaging the telephone when positioned therein. The adjustment screw has a gripping pad disposed on a free end thereof. The vertical portion has a screw extending inwardly therefrom for extending through the slot of the lower end of the lower portion of the headband. A nut engages the screw for locking the telephone clamp with respect to the headband.

There has thus bee n outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new telephone supporting device apparatus and method which has many of the advantages of the telephone supports mentioned heretofore and many novel features that result in a new telephone supporting device which is not anticipated, rendered obvious, suggested, or even implied by any of the prior art telephone supports, either alone or in any combination thereof.

It is another object of the present invention to provide a new telephone supporting device which may be easily and efficiently manufactured and marketed.

It is a further object of the present invention to provide a new telephone supporting device which is of a durable and reliable construction.

An even further object of the present invention is to provide a new telephone supporting device which is susceptible of a low cost of manufacture with regard to both materials and labor, and which accordingly is then susceptible of low prices of sale to the consuming public, thereby making such telephone supporting device economically available to the buying public.

Still yet another object of the present invention is to provide a new telephone supporting device which provides in the apparatuses and methods of the prior art some of the advantages thereof, while simultaneously overcoming some of the disadvantages normally associated therewith.

Still another object of the present invention is to provide a new telephone supporting device for preventing cricks and cramps in the neck caused by holding a phone between the head and shoulder.

Yet another object of the present invention is to provide a new telephone supporting device which includes a headband having a generally inverted U-shaped configuration. A lower end has an elongated vertically disposed slot formed therethrough. A telephone clamp is adjustably coupled with respect to the headband. The telephone clamp includes a vertical portion having outwardly extending tab portions from opposite ends thereof. A space between the tab portions is dimensioned for receiving a telephone therebetween. One of the tab portions has an adjustment screw extending therethrough for engaging the telephone when positioned therein. The adjustment screw has a gripping pad disposed on a free end thereof. The vertical portion has a screw extending inwardly therefrom for extending through the slot of the lower end of the headband. A nut engages the screw for locking the telephone clamp with respect to the headband.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
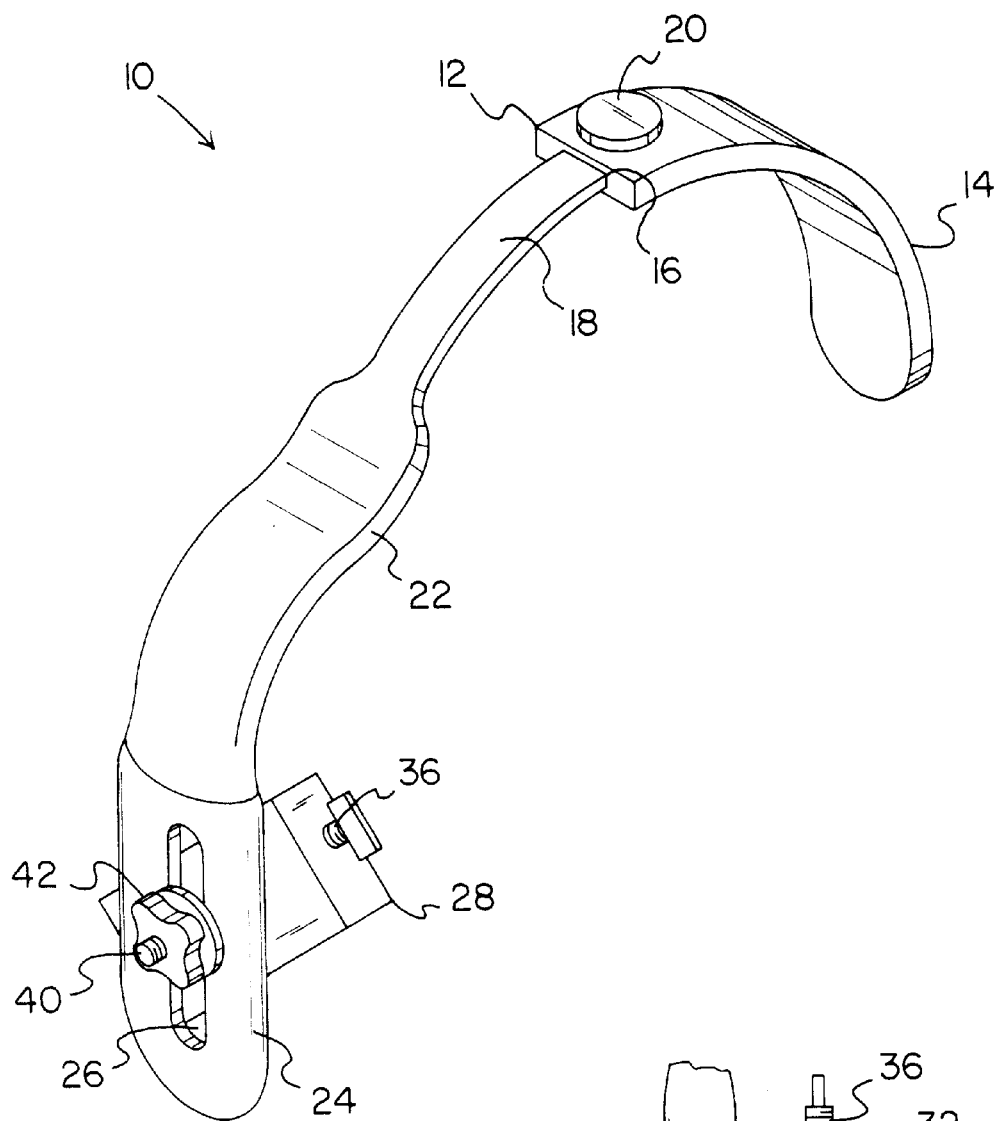
FIG. 1 is a perspective view of a new telephone supporting device according to the present invention.
Figure 2:
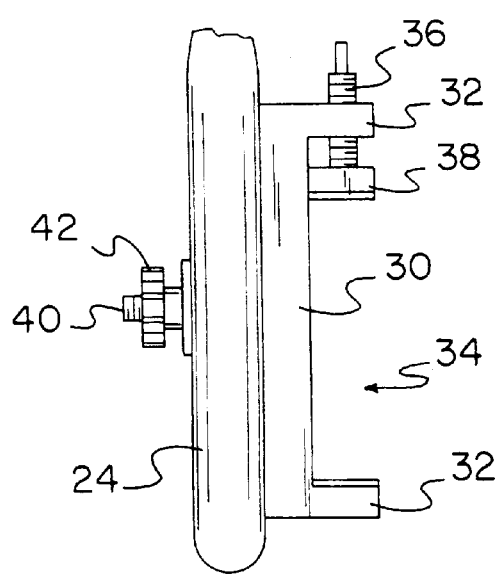
FIG. 2 is a side view of the telephone clamp of the present invention.
Figure 3:
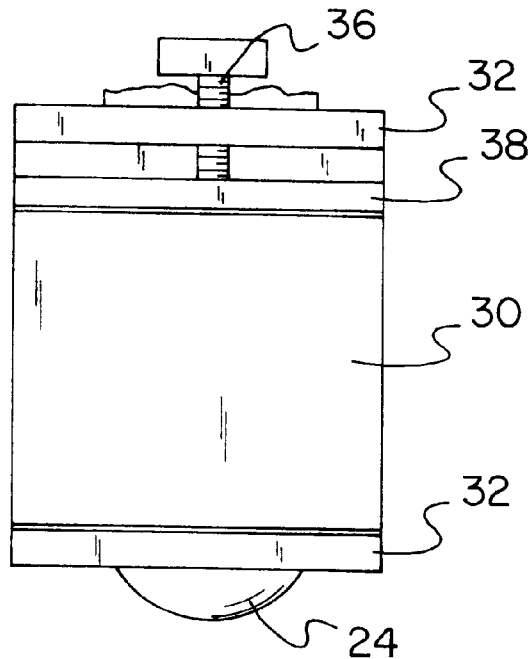
FIG. 3 is a front view of the telephone clamp of the present invention.
Figure 4:
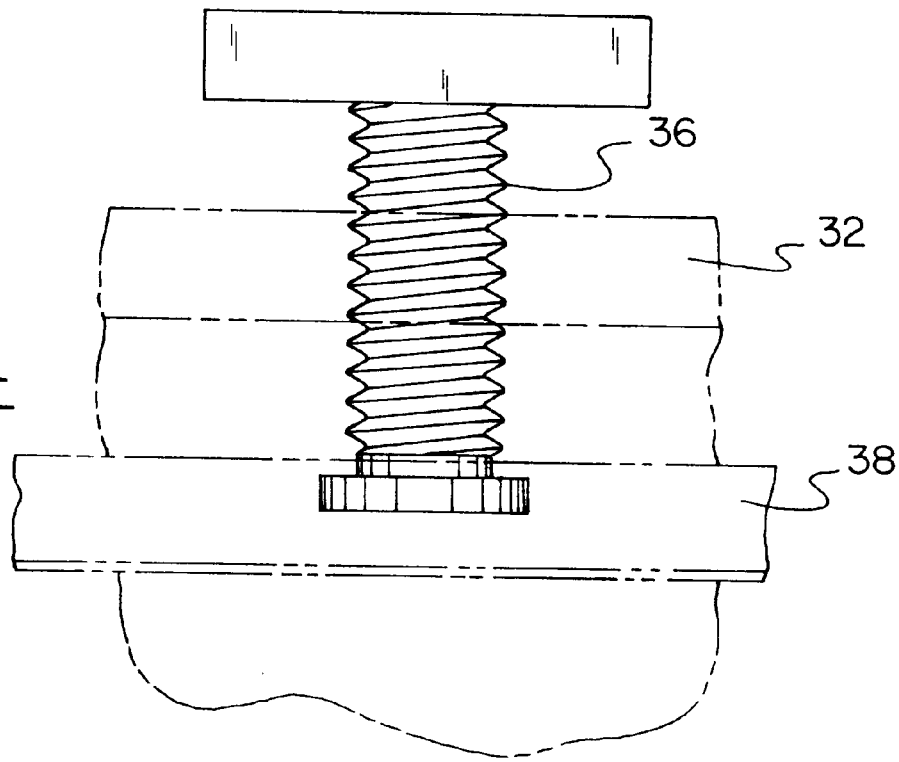
FIG. 4 is a side view of the telephone clamp adjustment screw of the present invention.

With reference now to the drawings, and in particular to FIGS. 1 through 4 thereof, a new telephone supporting device embodying the principles and concepts of the present invention and generally designated by the reference numeral 10 will be described.

As best illustrated in FIGS. 1 through 4, the telephone supporting device 10 comprises a headband 12 having a generally inverted U-shaped configuration. The headband 12 includes a pair of opposed arcuate sections 14 adjustably coupled together. An upper section has a channel 16 formed therein. A lower section has an elongated band 18 slidably received within the channel 16. An adjustment screw 20 extends through the upper section into communication with the channel 16 for engaging the elongated band 18. A lower portion of the lower section has an outward bend 22 formed therein. The lower section has a lower end 24 that swivels with respect thereto. The lower end 24 has an elongated vertically disposed slot 26 formed therethrough.

A telephone clamp 28 is adjustably coupled with respect to the headband. The telephone clamp 28 includes a vertical portion 30 having outwardly extending tab portions 32 from opposite ends thereof. A space 34 between the tab portions 32 is dimensioned for receiving a telephone therebetween. One of the tab portions 32 has an adjustment screw 36 extending therethrough for engaging the telephone when positioned therein. The adjustment screw 36 has a gripping pad 38 disposed on a free end thereof. The vertical portion 30 has a screw 40 extending inwardly therefrom for extending through the slot 26 of the lower end 24 of the lower portion of the headband 12. A nut 42 engages the screw 40 for locking the telephone clamp 28 with respect to the headband 12.

In use, the headband 12 of the present invention is designed to be worn on the user's head. The headband 12 would adjust to fit various users. The headband 12 would grip the head firmly with the telephone clamp 28 gripping a standard telephone handset. The outward bend 22 of the headband prevents the handset from being pressed against the user's head. Thus, the user would be able to speak on the phone without having to hold the phone with one hand. It would also eliminate the need to tilt the head to one side to hold the phone in place. The lower end 24 of the headband 12 allow the telephone clamp 28 to be spun, thus enabling the user to hold the phone to his left ear instead of the right.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new telephone supporting device for preventing cricks and cramps in the neck caused by holding a phone between the head and shoulder comprising, in combination:

a headband having a generally inverted U-shaped configuration, the headband including a pair of opposed arcuate sections adjustably coupled together, an upper section having a channel formed therein, a lower section having an elongated band slidably received within the channel, an adjustment screw extending through the upper section into communication with the channel for engaging the elongated band, a lower portion of the lower section having an outward bend formed therein, the lower section having a lower end that swivels with respect thereto, the lower end having an elongated vertically disposed slot formed therethrough;

a telephone clamp adjustably coupled with respect to the headband, the telephone clamp including a vertical portion having outwardly extending tab portions from opposite ends thereof, a space between the tab portions being dimensioned for receiving a telephone therebetween, one of the tab portions having an adjustment screw extending therethrough for engaging the telephone when positioned therein, the adjustment screw having a gripping pad disposed on a free end thereof, the vertical portion having a screw extending inwardly therefrom for extending through the slot of the lower end of the lower portion of the headband, a nut engaging the screw for locking the telephone clamp with respect to the headband.

2. A new telephone supporting device for preventing cricks and cramps in the neck caused by holding a phone between the head and shoulder comprising, in combination:

a headband having a generally inverted U-shaped configuration, a lower end of the headband having an elongated vertically disposed slot formed therethrough;

a telephone clamp adjustably coupled with respect to the headband, the telephone clamp including a vertical portion having outwardly extending tab portions from opposite ends thereof, a space between the tab portions being dimensioned for receiving a telephone therebetween, one of the tab portions having an adjustment screw extending therethrough for engaging the telephone when positioned therein, the adjustment screw having a gripping pad disposed on a free end thereof, the vertical portion having a screw extending inwardly therefrom for extending through the slot of the lower end of the headband, a nut engaging the screw for locking the telephone clamp with respect to the headband.

3. The telephone supporting device as set forth in claim 2 wherein the headband includes a pair of opposed arcuate sections adjustably coupled together.

4. The telephone supporting device as set forth in claim 3 wherein the upper section has a channel formed therein, a lower section having an elongated band slidably received within the channel, an adjustment screw extending through the upper section into communication with the channel for engaging the elongated band.

5. The telephone supporting device as set forth in claim 4 wherein a lower portion of the lower section has an outward bend formed therein.

6. The telephone supporting device as set forth in claim 5 wherein the lower section has a lower end that swivels with respect thereto.

* * * * *